US011961195B2

(12) United States Patent
Bullock

(10) Patent No.: US 11,961,195 B2
(45) Date of Patent: Apr. 16, 2024

(54) METHOD AND DEVICE FOR SKETCH-BASED PLACEMENT OF VIRTUAL OBJECTS

(71) Applicant: Apple Inc., Cupertino, CA (US)

(72) Inventor: Ryan Steven Bullock, Pleasanton, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/984,493

(22) Filed: Nov. 10, 2022

(65) Prior Publication Data

US 2023/0060596 A1 Mar. 2, 2023

Related U.S. Application Data

(63) Continuation of application No. 17/408,468, filed on Aug. 22, 2021, now Pat. No. 11,527,049, which is a (Continued)

(51) Int. Cl.
*G06T 19/00* (2011.01)
*G06F 3/01* (2006.01)
(Continued)

(52) U.S. Cl.
CPC ............ *G06T 19/006* (2013.01); *G06F 3/016* (2013.01); *G06T 7/70* (2017.01); *G06T 13/20* (2013.01);
(Continued)

(58) Field of Classification Search
CPC ........ G06F 3/016; G06T 19/006; G06T 19/20
See application file for complete search history.

(56) References Cited

U.S. PATENT DOCUMENTS 6,954,899 B1 10/2005 Anderson
10,068,379 B2 9/2018 Needham et al.
(Continued)

OTHER PUBLICATIONS

PCT International Search Report and Written Opinion dated Nov. 26, 2020, International Application No. PCT/US2020/047823, pp. 1-12.

(Continued)

*Primary Examiner* — Charles Tseng
(74) *Attorney, Agent, or Firm* — Fernando & Partners, LLP

(57) ABSTRACT

In some implementations, a method of sketch-based placement of computer-generated graphical objects includes: obtaining an input directed to a content creation region within a user interface, wherein the input corresponds to a sketch of a candidate object, and wherein the user interface includes the content creation region and a presentation region for computer-generated content; and in response to obtaining the input directed to the content creation region: presenting the sketch within the content creation region; obtaining a three-dimensional (3D) model using the input that corresponds to the sketch of the candidate object; generating a computer-generated graphical object using the obtained 3D model; and causing presentation of the computer-generated graphical object together with imagery obtained using the one or more cameras of the device within the presentation region while maintaining presentation of the sketch within the content creation region.

21 Claims, 9 Drawing Sheets

Related U.S. Application Data continuation of application No. PCT/US2020/047823, filed on Aug. 25, 2020.

(60) Provisional application No. 62/894,534, filed on Aug. 30, 2019.

(51) Int. Cl.
| | | |
|---|---|---|
| *G06T 7/70* | (2017.01) | |
| *G06T 13/20* | (2011.01) | |
| *G06T 15/04* | (2011.01) | |
| *G06T 17/20* | (2006.01) | |
| *G06T 19/20* | (2011.01) | |

(52) U.S. Cl.
CPC .............. *G06T 15/04* (2013.01); *G06T 17/20* (2013.01); *G06T 19/20* (2013.01); *G06T 2207/20092* (2013.01); *G06T 2219/2012* (2013.01); *G06T 2219/2016* (2013.01)

(56) References Cited

U.S. PATENT DOCUMENTS

| | | |
|---|---|---|
| 2015/0262412 A1 | 9/2015 | Gruber et al. |
| 2018/0096528 A1 | 4/2018 | Needham et al. |
| 2019/0260964 A1 | 8/2019 | Nagpal et al. |

OTHER PUBLICATIONS

B. Li et al., "Sketch-based 3D model retrieval by incorporating 2D-3D alignment," Multimedia Tools and Applications, vol. 65, No. 3, 2013, pp. 363-385, (Copy of Abstract Provided).

Kin Chung Kwan et al., "Mobi3DSketch: 3D Sketching in Mobile AR," Proceedings of the 2019 CHI Conference on Human Factors in Computing Systems, 2019, pp. 1-11.

Examination Report for corresponding European Appl. No. 20768751.8 dated Nov. 22, 2023, 5 pages.

METHOD AND DEVICE FOR SKETCH-BASED PLACEMENT OF VIRTUAL OBJECTS

CROSS-REFERENCE TO RELATED APPLICATIONS

This application is a continuation of U.S. Non-Provisional patent application Ser. No. 17/408,468, filed Aug. 22, 2021, which is a continuation of Intl. Patent App. No. PCT/US2020/047823, filed on Aug. 25, 2020, which claims priority to U.S. Provisional Patent App. No. 62/894,534, filed on Aug. 30, 2019, which are hereby incorporated by reference in their entireties.

TECHNICAL FIELD

The present disclosure generally relates to computer graphics, and in particular, to systems, methods, and devices for sketch-based placement of computer-generated graphical objects.

BACKGROUND

In some instances, a user may populate their computer-generated room by selecting virtual objects from a pre-existing library. However, this limits the customizability of the computer-generated room.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
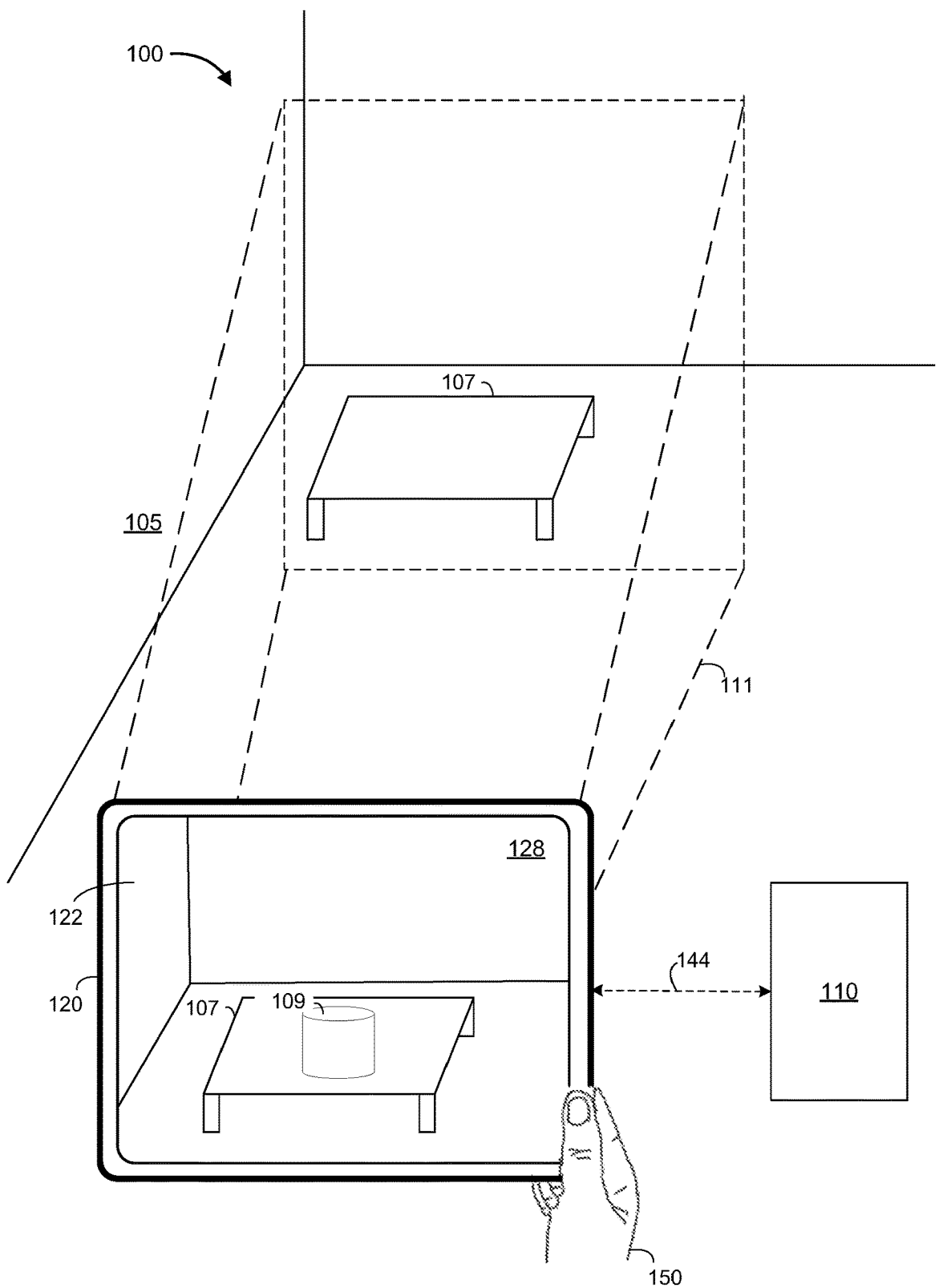
FIG. 1 is a block diagram of an example operating architecture in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

SUMMARY

Various implementations disclosed herein include devices, systems, and methods for sketch-based placement of computer-generated graphical objects (sometimes also referred to as "virtual objects", "graphical objects", or "extended reality (XR) objects") into a computer-generated graphical setting (sometimes also referred to as a "virtual environment", a "graphical environment", or an "XR environment"). As these objects and settings are provided using electronic devices such as tablets, smartphones, computers, they are sometimes also referred to as computer-generated objects or computer-generated settings. According to some implementations, the method is performed at a device including one or more cameras and non-transitory memory coupled to one or more processors. In various implementations, the method is performed at a computing system including non-transitory memory and one or more processors, wherein the computing system is communicatively coupled to a display device and one or more input devices. The method includes obtaining an input directed to a content creation interface (e.g., a sketchpad), wherein the input corresponds to a sketch of a candidate object, and wherein the content creation interface facilitates creation of computer-generated graphical objects presentable using the device. The method also includes: obtaining a three-dimensional (3D) model using the input that corresponds to the sketch of the candidate object; generating a computer-generated graphical object using the obtained 3D model; and causing presentation of the computer-generated graphical object together with imagery obtained using the one or more cameras of the device.

In accordance with some implementations, an electronic device includes one or more displays, one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more displays, one or more processors, a non-transitory memory, and means for performing or causing performance of any of the methods described herein.

In accordance with some implementations, a computing system includes one or more processors, non-transitory memory, an interface for communicating with a display device and one or more input devices, and one or more programs; the one or more programs are stored in the non-transitory memory and configured to be executed by the one or more processors and the one or more programs include instructions for performing or causing performance of the operations of any of the methods described herein. In accordance with some implementations, a non-transitory computer readable storage medium has stored therein instructions which when executed by one or more processors of a computing system with an interface for communicating with a display device and one or more input devices, cause the computing system to perform or cause performance of the operations of any of the methods described herein. In accordance with some implementations, a computing system includes one or more processors, non-transitory memory, an interface for communicating with a display device and one or more input devices, and means for performing or causing performance of the operations of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein. Various examples of electronic systems and techniques for using such systems in relation to various extended reality technologies are described.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, ahead mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

FIG. 1 is a block diagram of an example operating architecture 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating architecture 100 includes an optional controller 110 and an electronic device 120 (e.g., a tablet, mobile phone, laptop, near-eye system, wearable computing device, or the like).

In some implementations, the controller 110 is configured to manage and coordinate a computer-generated graphical experience (sometimes also referred to herein as a "computer-generated graphical setting", a "XR environment" or a "virtual environment" or a "graphical environment") for a user 150 and optionally other users. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In some implementations, the functions of the controller 110 are provided by the electronic device 120. As such, in some implementations, the components of the controller 110 are integrated into the electronic device 120.

In some implementations, the electronic device 120 is configured to present audio and/or video (A/V) content to the user 150. In some implementations, the electronic device 120 is configured to present a user interface (UI) and/or an XR environment 128 to the user 150. In some implementations, the electronic device 120 includes a suitable combination of software, firmware, and/or hardware. The electronic device 120 is described in greater detail below with respect to FIG. 3.

According to some implementations, the electronic device 120 presents an XR experience to the user 150 while the user 150 is physically present within a physical environment 105 that includes a table 107 within the field-of-view (FOV) 111 of the electronic device 120. As such, in some implementations, the user 150 holds the electronic device 120 in his/her hand(s). In some implementations, while presenting the XR experience, the electronic device 120 is configured to present XR content (sometimes also referred to herein as "computer-generated graphical content", "graphical content", or "virtual content"), including an XR cylinder 109, and to enable video pass-through of the physical environment 105 (e.g., including the table 107) on a display 122. For example, the XR environment 128, including the XR cylinder 109, is volumetric or three-dimensional (3D).

In one example, the XR cylinder 109 corresponds to display-locked content such that the XR cylinder 109 remains displayed at the same location on the display 122 as the FOV 111 changes due to translational and/or rotational movement of the electronic device 120. As another example, the XR cylinder 109 corresponds to world-locked content such that the XR cylinder 109 remains displayed at its origin location as the FOV 111 changes due to translational and/or rotational movement of the electronic device 120. As such, in this example, if the FOV 111 does not include the origin location, the XR environment 128 will not include the XR cylinder 109. For example, the electronic device 120 corresponds to a near-eye system, mobile phone, tablet, laptop, wearable computing device, or the like.

In some implementations, the display 122 corresponds to an additive display that enables optical see-through of the physical environment 105 including the table 107. For example, the display 122 corresponds to a transparent lens, and the electronic device 120 corresponds to a pair of glasses worn by the user 150. As such, in some implementations, the electronic device 120 presents a user interface by projecting the XR content (e.g., the XR cylinder 109) onto the additive display, which is, in turn, overlaid on the physical environment 105 from the perspective of the user 150. In some implementations, the electronic device 120 presents the user interface by displaying the XR content (e.g., the XR cylinder 109) on the additive display, which is, in turn, overlaid on the physical environment 105 from the perspective of the user 150.

In some implementations, the user 150 wears the electronic device 120 such as a near-eye system. As such, the electronic device 120 includes one or more displays provided to display the XR content (e.g., a single display or one for each eye). For example, the electronic device 120 encloses the FOV of the user 150. In such implementations, the electronic device 120 presents the XR environment 128 by displaying data corresponding to the XR environment 128 on the one or more displays or by projecting data corresponding to the XR environment 128 onto the retinas of the user 150.

In some implementations, the electronic device 120 includes an integrated display (e.g., a built-in display) that displays the XR environment 128. In some implementations, the electronic device 120 includes a head-mountable enclosure. In various implementations, the head-mountable enclosure includes an attachment region to which another device with a display can be attached. For example, in some implementations, the electronic device 120 can be attached to the head-mountable enclosure. In various implementations, the head-mountable enclosure is shaped to form a receptacle for receiving another device that includes a display (e.g., the electronic device 120). For example, in some implementations, the electronic device 120 slides/snaps into or otherwise attaches to the head-mountable enclosure. In some implementations, the display of the device attached to the head-mountable enclosure presents (e.g., displays) the XR environment 128. In some implementations, the electronic device 120 is replaced with an XR chamber, enclosure, or room configured to present XR content in which the user 150 does not wear the electronic device 120.

In some implementations, the controller 110 and/or the electronic device 120 cause an XR representation of the user 150 to move within the XR environment 128 based on movement information (e.g., body pose data, eye tracking data, hand/limb/finger/extremity tracking data, etc.) from the electronic device 120 and/or optional remote input devices within the physical environment 105. In some implementations, the optional remote input devices correspond to fixed or movable sensory equipment within the physical environment 105 (e.g., image sensors, depth sensors, infrared (IR) sensors, event cameras, microphones, etc.). In some implementations, each of the remote input devices is configured to collect/capture input data and provide the input data to the controller 110 and/or the electronic device 120 while the user 150 is physically within the physical environment 105. In some implementations, the remote input devices include microphones, and the input data includes audio data associated with the user 150 (e.g., speech samples). In some implementations, the remote input devices include image sensors (e.g., cameras), and the input data includes images of the user 150. In some implementations, the input data characterizes body poses of the user 150 at different times. In some implementations, the input data characterizes head poses of the user 150 at different times. In some implementations, the input data characterizes hand tracking information associated with the hands of the user 150 at different times. In some implementations, the input data characterizes the velocity and/or acceleration of body parts of the user 150 such as his/her hands. In some implementations, the input data indicates joint positions and/or joint orientations of the user 150. In some implementations, the remote input devices include feedback devices such as speakers, lights, or the like.

Figure 2:
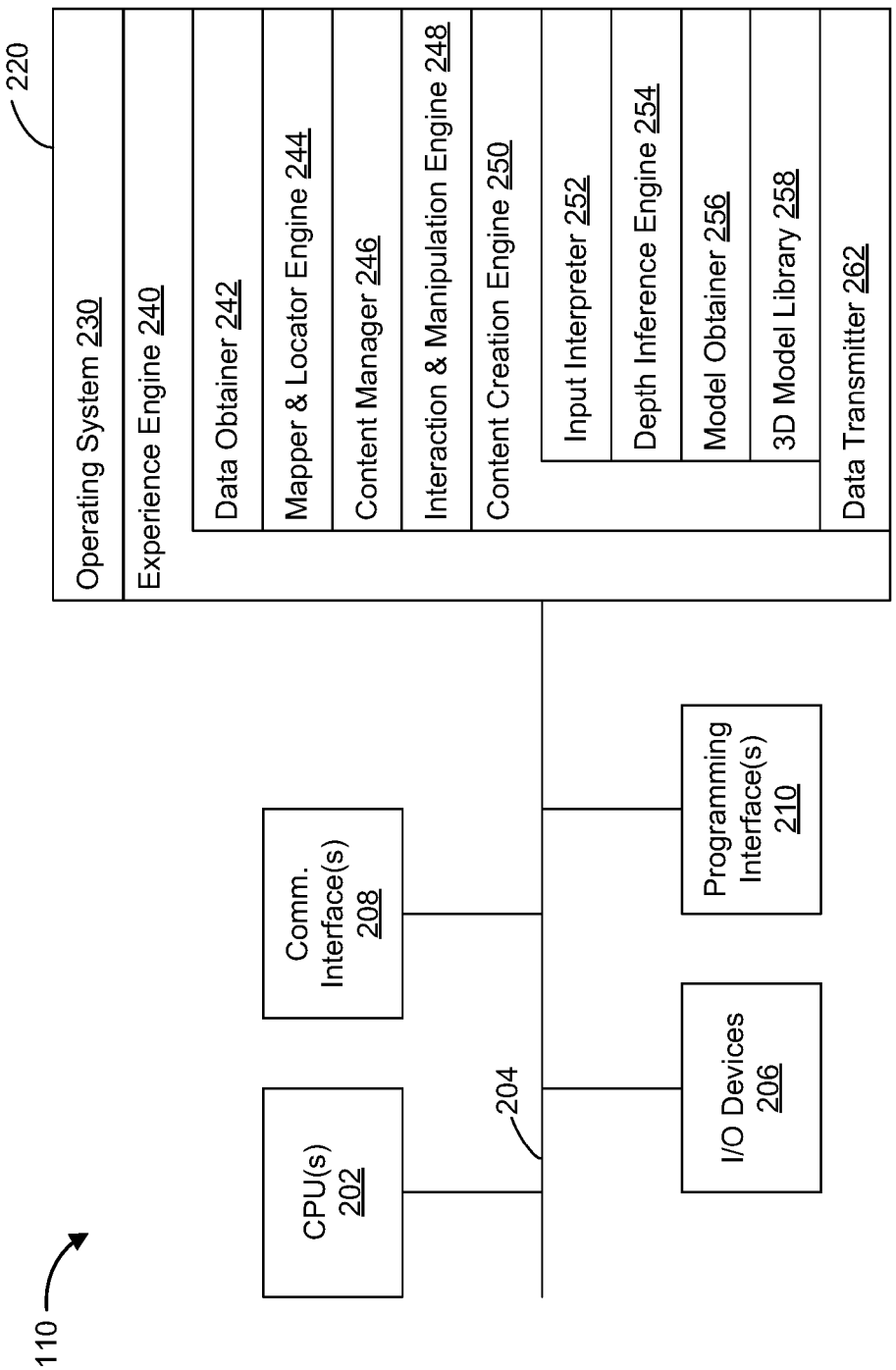
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an experience engine 240.

The operating system 230 includes procedures for handling various basic system services and for performing hardware dependent tasks.

In some implementations, the experience engine 240 is configured to manage and coordinate one or more computer-generated graphical experiences (sometimes also referred to herein as a "computer-generated graphical setting", a "virtual environment", a "graphical environment", or an "XR environment") for one or more users (e.g., a single computer-generated graphical experience for one or more users, or multiple computer-generated graphical experiences for respective groups of one or more users). To that end, in various implementations, the experience engine 240 includes a data obtainer 242, a mapper and locator engine 244, a content manager 246, an interaction and manipulation engine 248, a content creation engine 250, and a data transmitter 262.

In some implementations, the data obtainer 242 is configured to obtain data (e.g., presentation data, input data, user interaction data, user inputs, sensor data, location data, etc.) from at least one of the I/O devices 206 of the controller 110, the electronic device 120, and the optional remote input devices 170A and 170B. To that end, in various implementations, the data obtainer 242 includes instructions and/or logic therefor, and heuristics and metadata therefor.

In some implementations, the mapper and locator engine 244 is configured to map the physical environment 105 and to track the position/location of at least the electronic device 120 with respect to the physical environment 105. To that end, in various implementations, the mapper and locator engine 244 includes instructions and/or logic therefor, and heuristics and metadata therefor.

In some implementations, the content manager 246 is configured to generate (i.e., render), manage, and modify a computer-generated graphical setting (sometimes also referred to as a "computer-generated graphical experience", a "virtual environment", a "graphical environment", or an "XR environment") presented to a user. To that end, in various implementations, the content manager 246 includes instructions and/or logic therefor, and heuristics and metadata therefor.

In some implementations, the interaction and manipulation engine 248 is configured to interpret user interactions and/or modification inputs directed to the computer-generated graphical setting. To that end, in various implementations, the interaction and manipulation engine 248 includes instructions and/or logic therefor, and heuristics and metadata therefor.

In some implementations, the content creation engine 250 is configured to obtain computer-generated graphical objects (sometimes also referred to as "virtual objects", "graphical objects", or "XR objects") for placement into the computer-generated graphical setting based on a user input, wherein the user input corresponds to a sketch of a candidate object. To that end, in various implementations, the content creation engine 250 includes an input interpreter 252, an optional depth inference engine 254, a model obtainer 256, and an optional 3D model library 258.

In some implementations, the input interpreter 252 is configured to obtain and interpret user input(s) (e.g., content creation input(s)) directed to a content creation interface. According to some implementations, the content creation interface corresponds to a planar, 2D interface. According to some implementations, the content creation interface corresponds to a volumetric, 3D interface. According to some implementations, the user input(s) correspond to one or more stylus inputs, touch inputs, eye tracking inputs, finger/hand tracking inputs, etc. within the content creation interface. To that end, in various implementations, the input interpreter 252 includes instructions and/or logic therefor, and heuristics and metadata therefor.

In some implementations, the optional depth inference engine 254 is configured to infer depth information (e.g., a depth map or mesh) for the candidate object corresponding to the sketch based on photogrammetry techniques or the like. To that end, in various implementations, the depth inference engine 254 includes instructions and/or logic therefor, and heuristics and metadata therefor.

In some implementations, the model obtainer 256 is configured to obtain a 3D model based on the user input(s) that corresponds to the sketch of the candidate object. According to some implementations, obtaining the 3D model includes matching the sketch of the candidate object to a pre-existing 3D model in a 3D model library 258. According to some implementations, the 3D model library 258 is stored locally or remotely with respect to the controller 110. According to some implementations, the 3D model library 258 stores a plurality of 3D models. According to some implementations, obtaining the 3D model includes generating the 3D model based on the sketch of the candidate object and the depth information from the depth inference engine 254. In some implementations, the model obtainer 256 is also configured to generate a computer-generated graphical object using the obtained 3D model. For example, the model obtainer 256 generates the computer-generated graphical object by applying a texture or UV map to a mesh (e.g., the obtained 3D model). To that end, in various implementations, the model obtainer 256 includes instructions and/or logic therefor, and heuristics and metadata therefor.

In some implementations, the data transmitter 262 is configured to transmit data (e.g., presentation data such as rendered image frames associated with the computer-generated graphical setting, location data, etc.) to at least the electronic device 120. To that end, in various implementations, the data transmitter 262 includes instructions and/or logic therefor, and heuristics and metadata therefor.

Although the data obtainer 242, the mapper and locator engine 244, the content manager 246, the interaction and manipulation engine 248, the content creation engine 250, and the data transmitter 262 are shown as residing on a single device (e.g., the controller 110), it should be understood that in other implementations, any combination of the data obtainer 242, the mapper and locator engine 244, the content manager 246, the interaction and manipulation engine 248, the content creation engine 250, and the data transmitter 262 may be located in separate computing devices.

In some implementations, the functions and/or components of the controller 110 are combined with or provided by the electronic device 120 shown below in FIG. 3. Moreover, FIG. 2 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
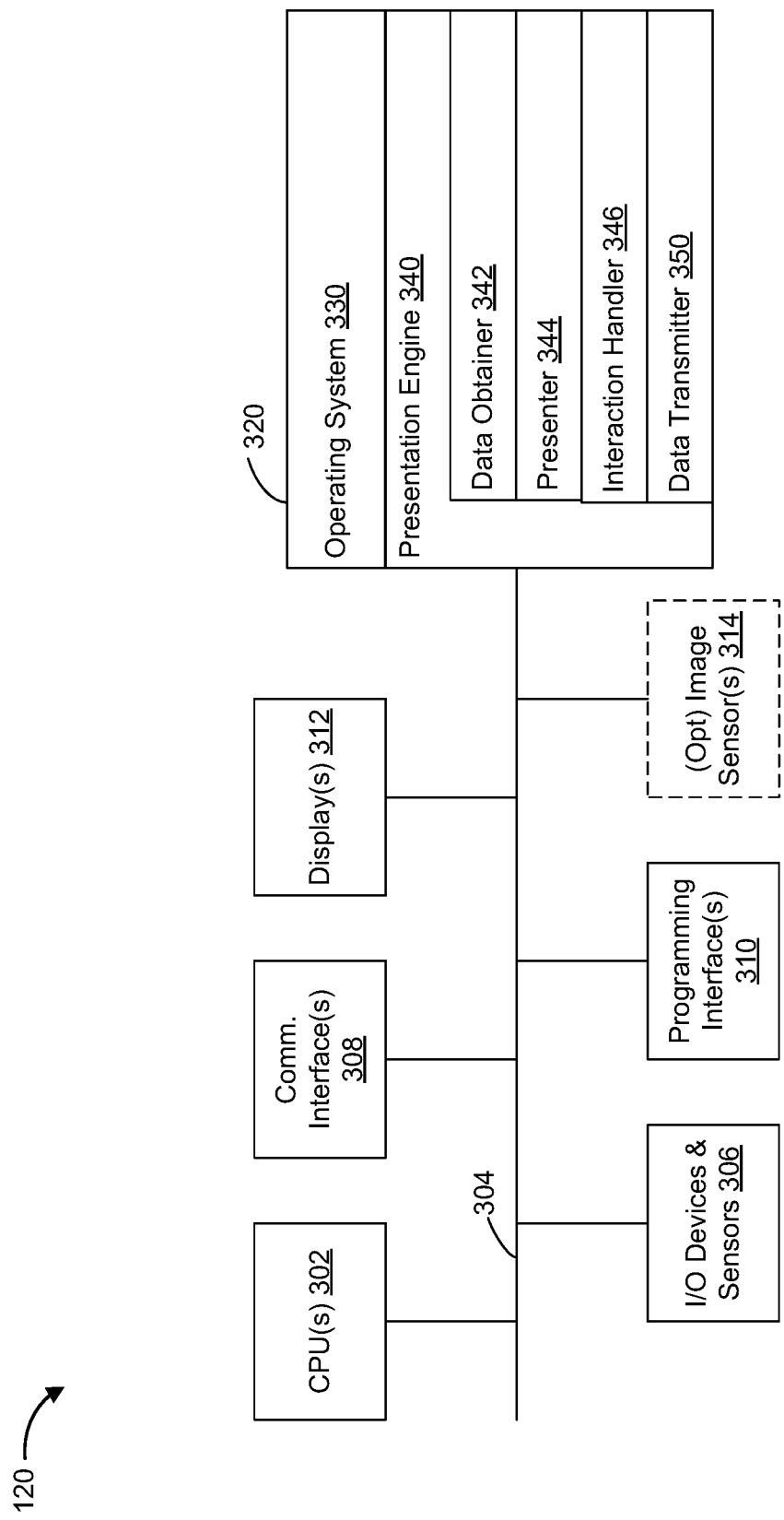
FIG. 3 is a block diagram of an example electronic device in accordance with some implementations.

FIG. 3 is a block diagram of an example of the electronic device 120 (e.g., a mobile phone, tablet, laptop, wearable computing device, or the like) in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations, the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a magnetometer, a thermometer, one or more physiological sensors (e.g., blood pressure monitor, heart rate monitor, blood oxygen sensor, blood glucose sensor, etc.), one or more microphones, one or more speakers, a haptics engine, a heating and/or cooling unit, a skin shear engine, one or more depth sensors (e.g., structured light, time-of-flight, or the like), an eye tracking engine, and/or the like.

In some implementations, the one or more displays 312 are configured to present the computer-generated graphical setting to the user. In some implementations, the one or more displays 312 are also configured to present flat video content to the user (e.g., a 2-dimensional or "flat" AVI, FLV, WMV, MOV, MP4, or the like file associated with a TV episode or a movie, or live video pass-through of the physical environment 105). In some implementations, the one or more displays 312 correspond to touchscreen displays. In some implementations, the one or more displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more displays 312 correspond to diffractive, reflective, polarized, holographic, etc. waveguide displays. For example, the electronic device 120 includes a single display. In another example, the electronic device 120 includes a display for each eye of the user. In some implementations, the one or more displays 312 are capable of presenting AR and VR content. In some implementations, the one or more displays 312 are capable of presenting AR or VR content.

In some implementations, the one or more optional interior- and/or exterior-facing image sensors 314 correspond to one or more RGB cameras (e.g., with a complementary metal-oxide-semiconductor (CMOS) image sensor or a charge-coupled device (CCD) image sensor), IR image sensors, event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and a presentation engine 340.

The operating system 330 includes procedures for handling various basic system services and for performing hardware dependent tasks. In some implementations, the presentation engine 340 is configured to present computer-generated graphical content to the user via the one or more displays 312. To that end, in various implementations, the presentation engine 340 includes a data obtainer 342, a presenter 344, an interaction handler 346, and a data transmitter 350.

In some implementations, the data obtainer 342 is configured to obtain data (e.g., presentation data such as rendered image frames associated with the computer-generated graphical setting, input data, user interaction data, user inputs, sensor data, location data, etc.) from at least one of the I/O devices and sensors 306 of the electronic device 120, the controller 110, and the remote input devices 170A and 170B. To that end, in various implementations, the data obtainer 342 includes instructions and/or logic therefor, and heuristics and metadata therefor.

In some implementations, the presenter 344 is configured to present and update computer-generated graphical content (e.g., the rendered image frames associated with the computer-generated graphical setting) via the one or more displays 312. To that end, in various implementations, the presenter 344 includes instructions and/or logic therefor, and heuristics and metadata therefor.

In some implementations, the interaction handler 346 is configured to detect user interactions with the presented computer-generated graphical content. In some implementations, the interaction handler 346 is configured to detect user inputs (e.g., content creation inputs) directed to a content creation interface. According to some implementations, the content creation interface corresponds to a planar, 2D interface. According to some implementations, the content creation interface corresponds to a volumetric, 3D interface. According to some implementations, the user input corresponds to one or more stylus inputs, touch inputs, eye tracking inputs, finger/hand tracking inputs, etc. within the content creation interface. To that end, in various implementations, the interaction handler 346 includes instructions and/or logic therefor, and heuristics and metadata therefor.

In some implementations, the data transmitter 350 is configured to transmit data (e.g., presentation data, location data, user interaction data, user inputs, etc.) to at least the controller 110. To that end, in various implementations, the data transmitter 350 includes instructions and/or logic therefor, and heuristics and metadata therefor.

Although the data obtainer 342, the presenter 344, the interaction handler 346, and the data transmitter 350 are shown as residing on a single device (e.g., the electronic device 120), it should be understood that in other implementations, any combination of the data obtainer 342, the presenter 344, the interaction handler 346, and the data transmitter 350 may be located in separate computing devices.

Moreover, FIG. 3 is intended more as a functional description of the various features which be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4A:
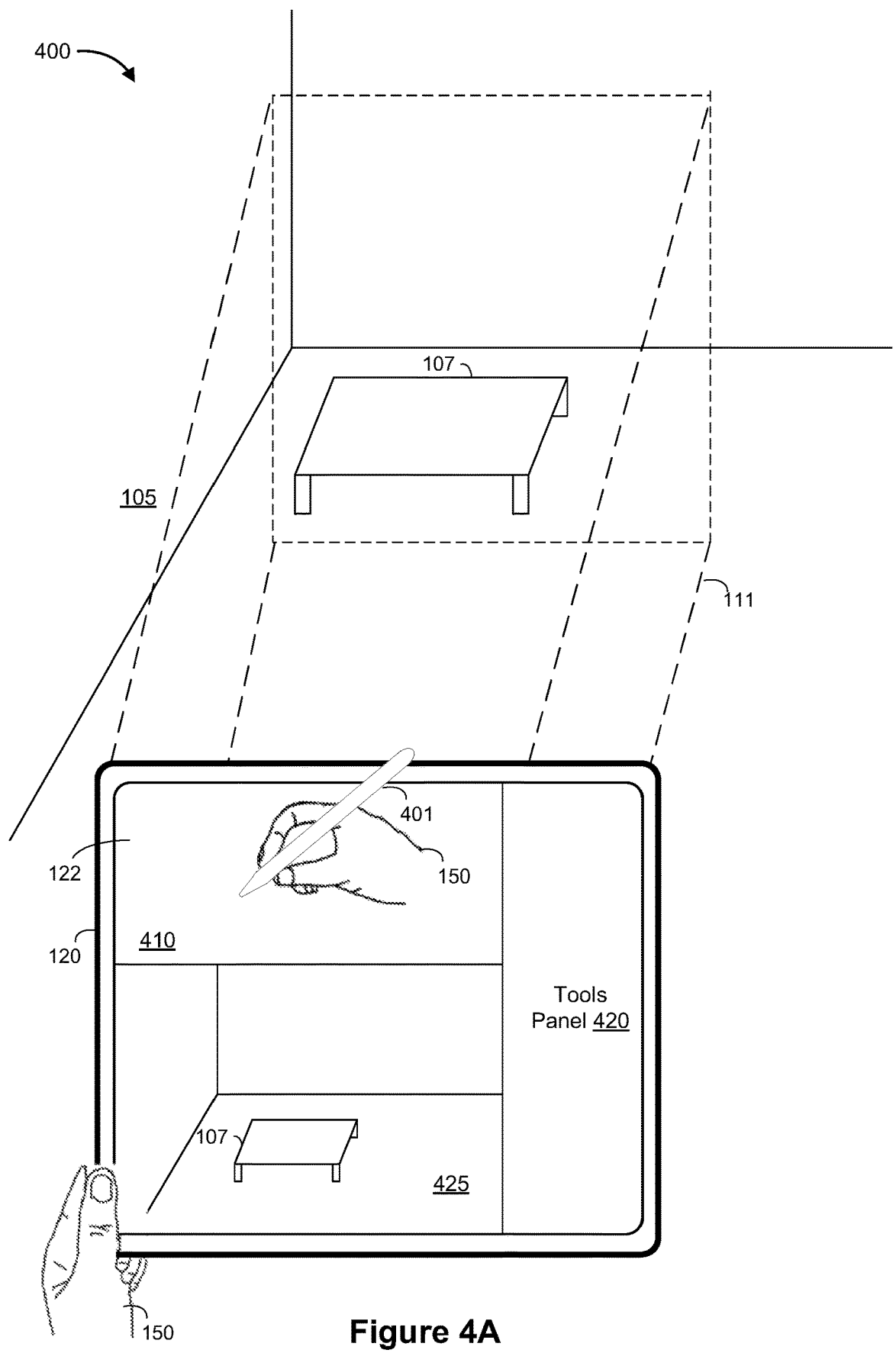
FIGS. 4A and 4B illustrate a first computer-generated graphical presentation scenario in accordance with some implementations.
Figure 4B:
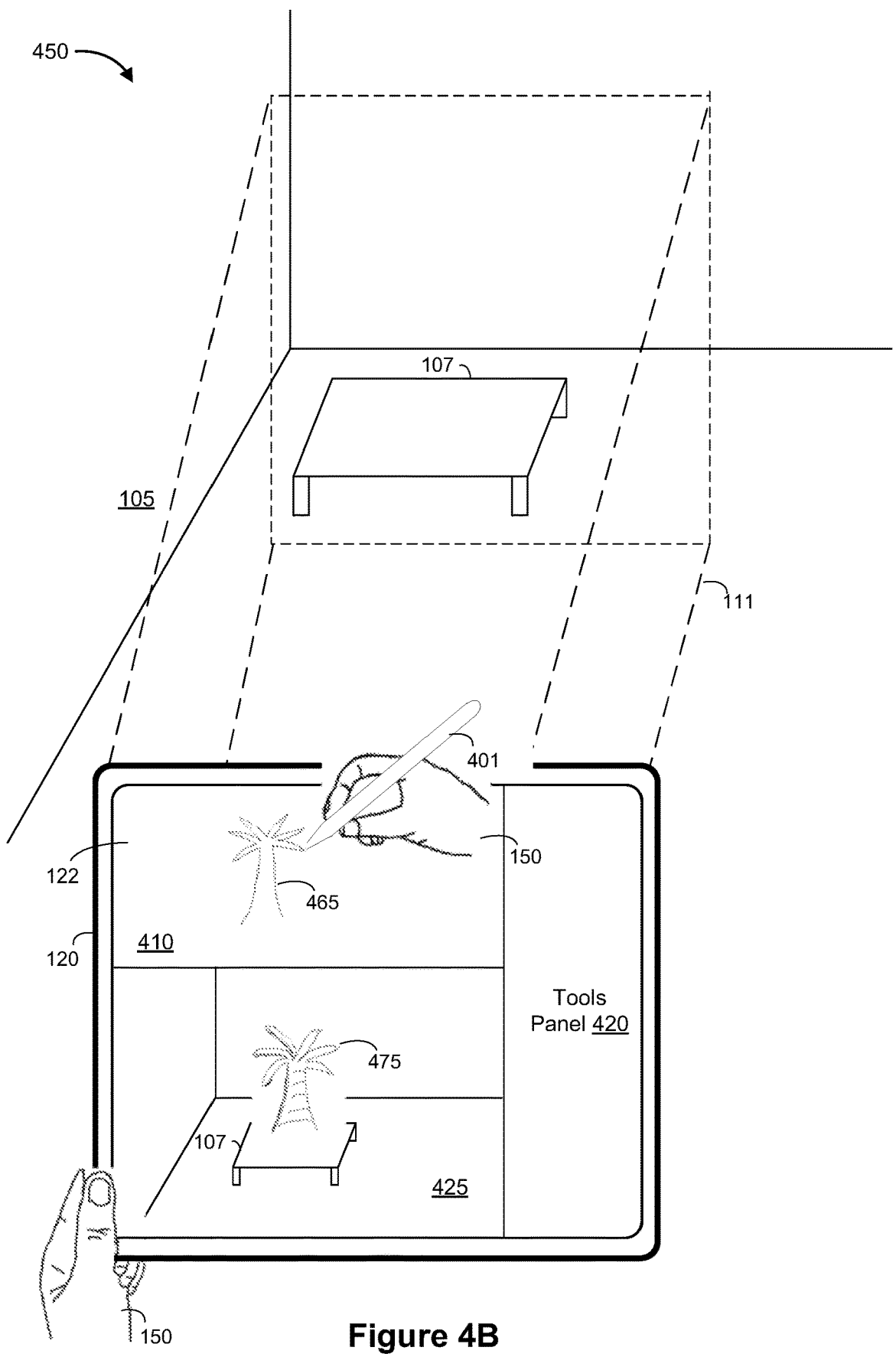

FIGS. 4A and 4B illustrate a first computer-generated graphical presentation scenario in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. FIGS. 4A and 4B show a sequence of instances 400 and 450, respectively, of the first computer-generated graphical presentation scenario.

As shown in FIG. 4A, the instance 400 of the first computer-generated graphical presentation scenario associated with time $T_1$ includes a physical environment 105 and a computer-generated graphical setting 425 displayed on the display 122 of the electronic device 120. The electronic device 120 presents the computer-generated graphical setting 425 to the user 150 while the user 150 is physically present within the physical environment 105 that includes the table 107 within the field-of-view 111 of an exterior-facing image sensor of the electronic device 120. As such, in some implementations, the user 150 holds the electronic device 120 in his/her hand(s) similar to the operating environment 100 in FIG. 1.

In other words, in some implementations, the electronic device 120 is configured to present computer-generated graphical content and to enable optical see-through or video pass-through of at least a portion of the physical environment 105 (e.g., including the table 107) on the display 122. For example, the electronic device 120 corresponds to a mobile phone, tablet, laptop, wearable computing device, or the like.

As shown in FIG. 4A, the electronic device 120 also displays a content creation interface 410 and a tools panel 420 on the display 122. According to some implementations, the content creation interface 410 is configured to detect/receive user inputs such as sketches or strokes with the stylus 401 held by the user 150 or touch/finger inputs from the user 150. According to some implementations, the tools panel 420 includes selectable tools configured to change one or more characteristics of the user inputs retrospectively and/or prospectively such as line thickness, line color, line type, fill color, texture filler, and/or the like.

In some implementations, in response to detecting a user input within the content creation interface 410 that corresponds to a sketch of a candidate object, the electronic device 120 is configured to obtain a 3D model based on the sketch of the candidate object and present a computer-generated graphical object within the computer-generated graphical setting 425 based on the 3D model. As such, computer-generated graphical objects are placed within the computer-generated graphical setting 425 based on user sketches directed to the content creation interface 410. In some implementations, the process for obtaining 3D models is described in more detail below with reference to the method 600 in FIGS. 6A and 6B. As shown in FIG. 4B, the instance 450 of the first computer-generated graphical presentation scenario associated with time $T_2$ shows a computer-generated graphical object 475 (e.g., a 3D palm tree) displayed within the computer-generated graphical setting 425 in response to detecting a user input 465 (e.g., a sketch of a palm tree) within the content creation interface 410.

Figure 5A:
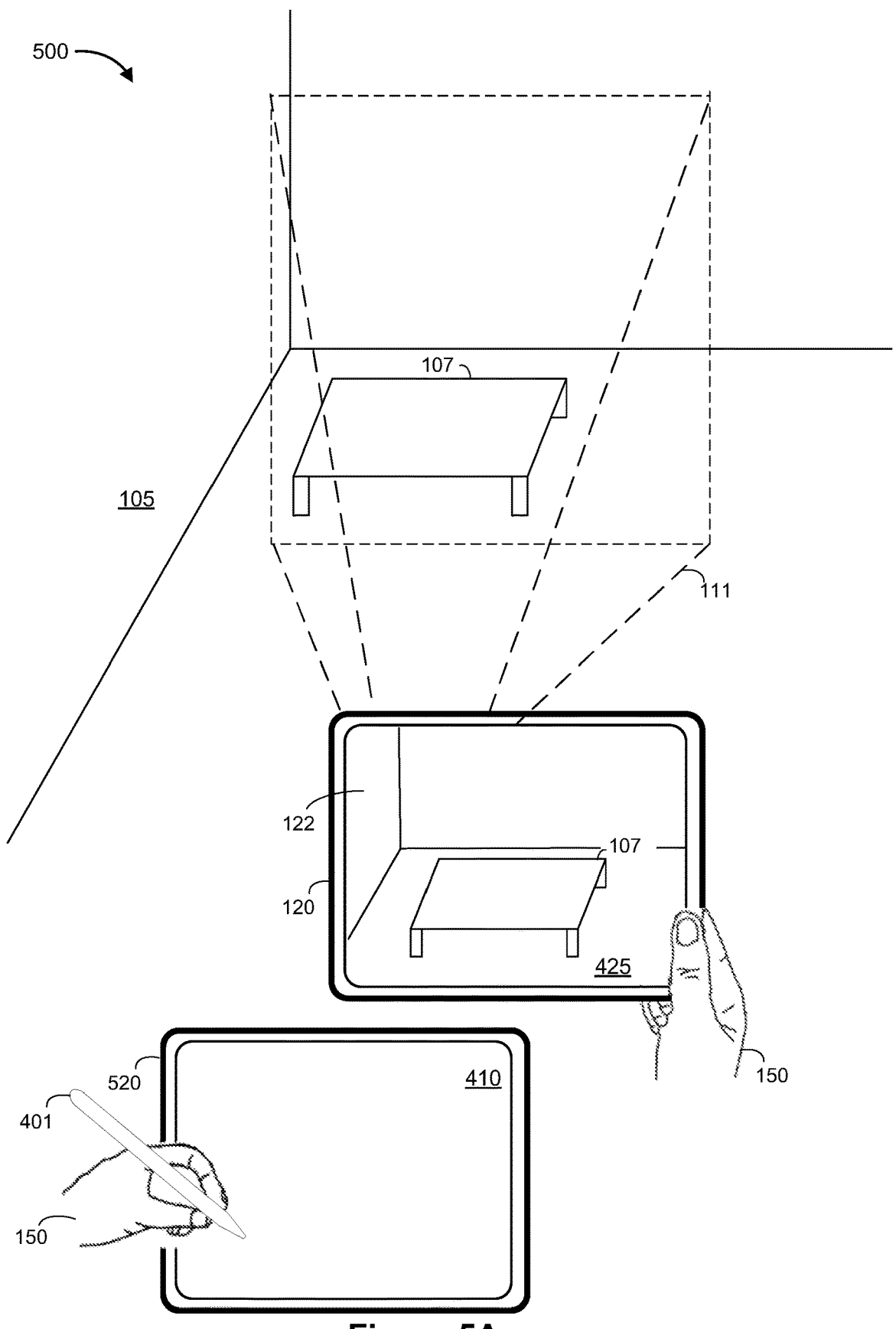
FIGS. 5A and 5B illustrate a second computer-generated graphical presentation scenario in accordance with some implementations.
Figure 5B:
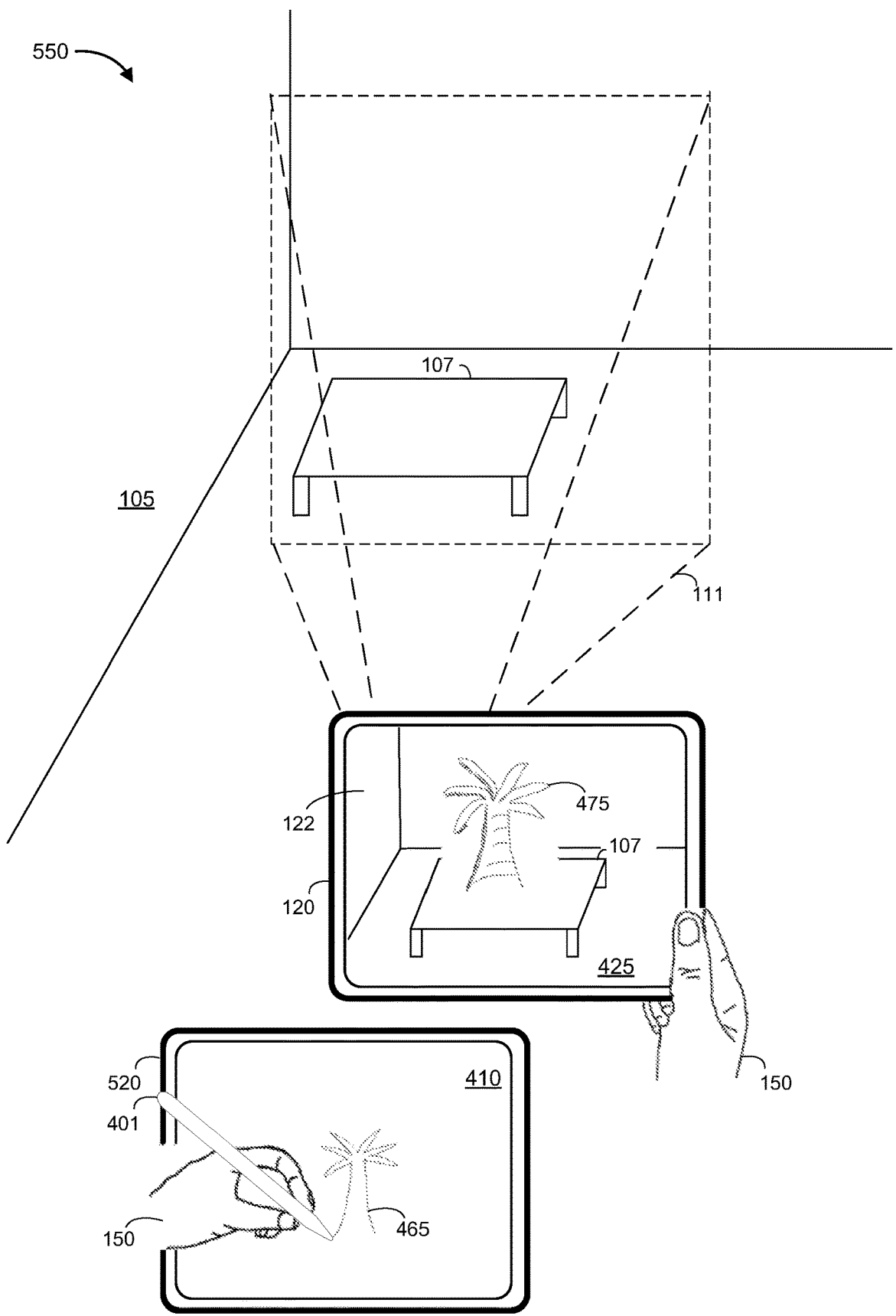

FIGS. 5A and 5B illustrate a second computer-generated graphical presentation scenario in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. FIGS. 5A and 5B are similar to and adapted from FIGS. 4A and 4B. Thus, similar reference numbers are used herein and only the differences will be discussed for the sake of brevity. FIGS. 5A and 5B show a sequence of instances 500 and 550, respectively, of the second computer-generated graphical presentation scenario.

As shown in FIG. 5A, the instance 500 of the second computer-generated graphical presentation scenario associated with time $T_1$ includes a physical environment 105, a computer-generated graphical setting 425 displayed on the display 122 of the electronic device 120, and a secondary electronic device 520. In some implementations, the electronic device 120 is configured to present computer-generated graphical content and to enable optical see-through or video pass-through of at least a portion of the physical environment 105 (e.g., including the table 107) on the display 122. As such, in some implementations, the user 150 holds the electronic device 120 in his/her hand(s) similar to the operating environment 100 in FIG. 1. For example, the electronic device 120 corresponds to a mobile phone, tablet, laptop, wearable computing device, or the like.

As shown in FIG. 5A, the secondary electronic device 520 displays a content creation interface 410. According to some implementations, the content creation interface 410 is configured to detect/receive inputs such as sketches or strokes with the stylus 401 held by the user 150 or touch inputs from the user 150. For example, the secondary electronic device 520 corresponds to a mobile phone, tablet, laptop, wearable computing device, or the like. According to some implementations, the secondary electronic device 520 is communicatively coupled with the electronic device 120 and/or the controller 110 via one or more wired or wireless communication channels (e.g., BLUETOOTH, IEEE 802.11x, IEEE 802.16x, IEEE 802.3x, etc.).

In some implementations, in response to detecting a user input within the content creation interface 410 that corresponds to a sketch of a candidate object, the electronic device 120 is configured to obtain a 3D model based on the sketch of the candidate object and present a computer-generated graphical object within the computer-generated graphical setting 425 based on the 3D model. As such, computer-generated graphical objects are placed within the computer-generated graphical setting 425 (presented by the electronic device 120) based on user sketches directed to the content creation interface 410 associated with the secondary electronic device 520. In some implementations, the process for obtaining 3D models is described in more detail below with reference to the method 600 in FIGS. 6A and 6B. As shown in FIG. 5B, the instance 550 of the second computer-generated graphical presentation scenario associated with time $T_2$ shows a computer-generated graphical object 475 (e.g., a 3D palm tree) displayed within the computer-generated graphical setting 425 presented by the electronic device 120 in response to detecting a user input 465 (e.g., a sketch of a palm tree) within the content creation interface 410 associated with the secondary electronic device 520.

Figure 6A:
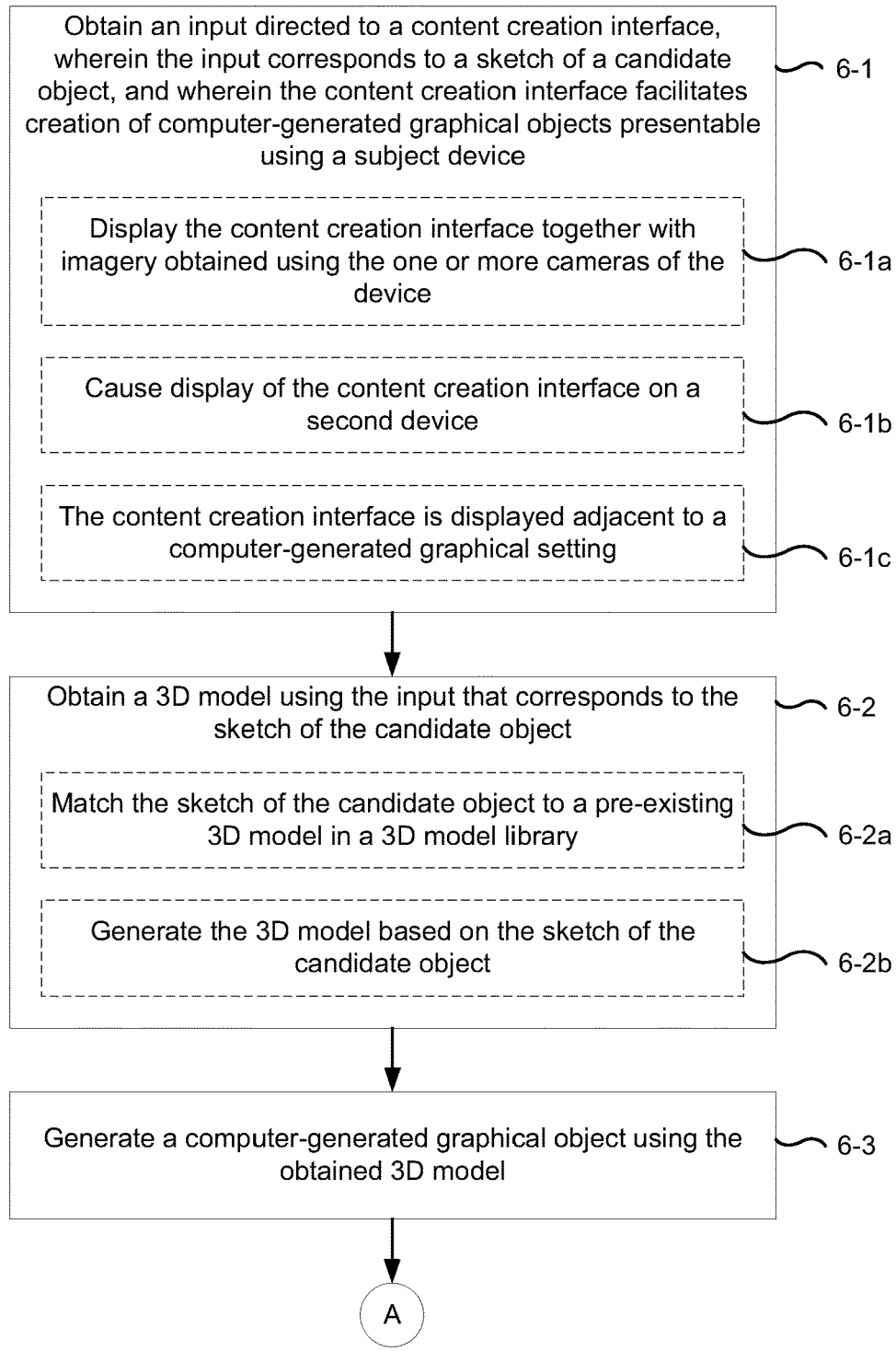
FIGS. 6A and 6B illustrate a flowchart representation of a method of sketch-based placement of computer-generated graphical objects in accordance with some implementations.
Figure 6B:
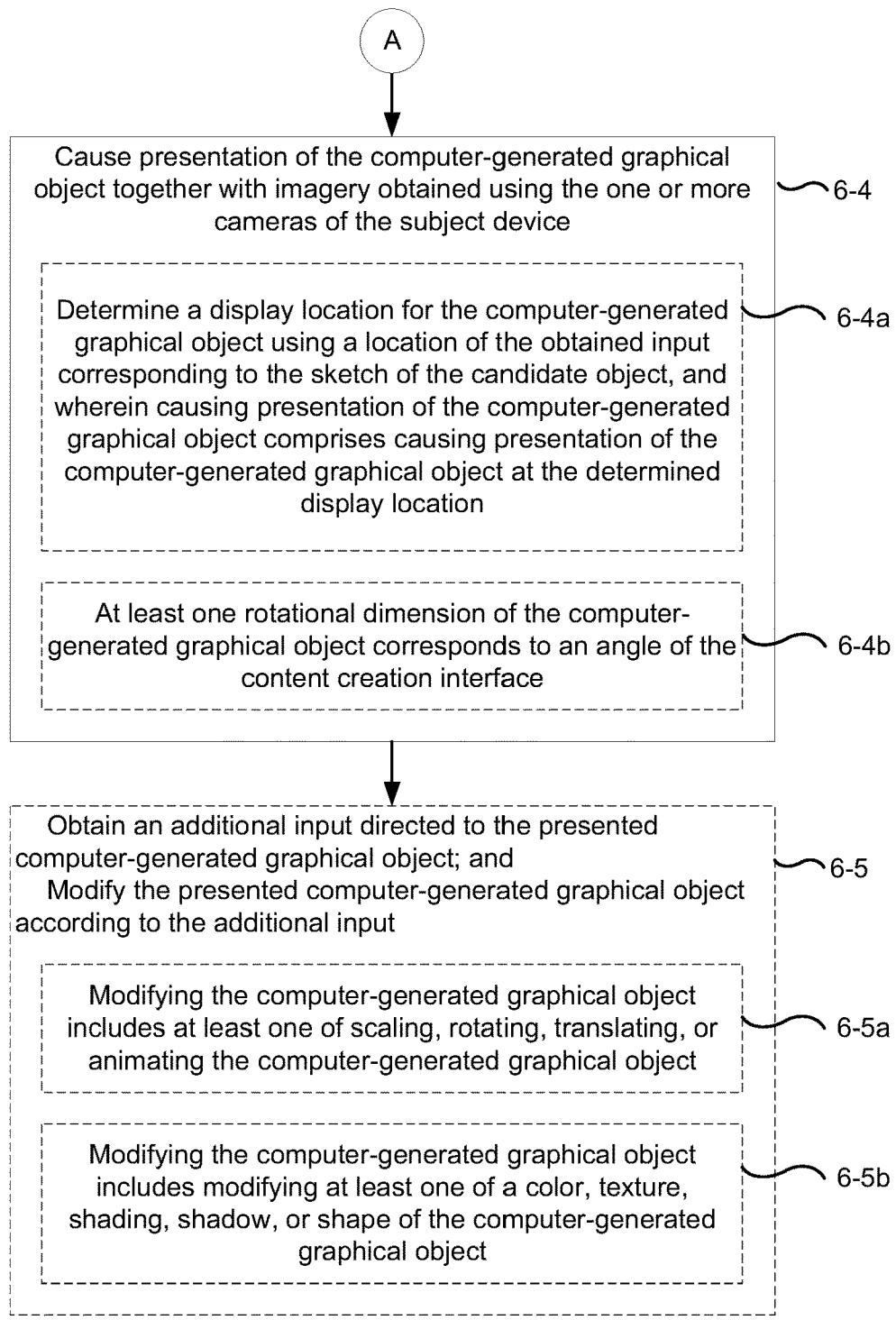

FIGS. 6A and 6B illustrate a flowchart representation of a method 600 of sketch-based placement of computer-generated graphical objects in accordance with some implementations. In various implementations, the method 600 is performed by a device with one or more cameras and non-transitory memory coupled to one or more processors (e.g., the controller 110 in FIGS. 1 and 2; the electronic device 120 in FIGS. 1 and 3; or a suitable combination thereof), or a component thereof. In various implementations, the method is performed at a computing system including non-transitory memory and one or more processors, wherein the computing system is communicatively coupled to a display device and one or more input devices. In some implementations, the method 600 is performed by processing logic, including hardware, firmware, software, or a combination thereof. In some implementations, the method 600 is performed by a processor executing code stored in a non-transitory computer-readable medium (e.g., a memory). In various implementations, some operations in method 600 are, optionally, combined and/or the order of some operations is, optionally, changed.

As described above, in some instances, a user may populate their computer-generated room by selecting virtual objects from a pre-existing library. However, this limits the customizability of the computer-generated room. As such, according to some implementations, in order to allow the user further customizability, a 3D model is obtained (e.g., matched against a library of computer-generated graphical objects or generated in real time) based on a sketch of a candidate object on a content creation interface (e.g., a sketchpad) and a computer-generated graphical object that corresponds to the 3D model is placed into a computer-generated graphical setting. In some implementations, the location of the sketch relative to the content creation interface defines the placement location of the computer-generated graphical object within the computer-generated graphical setting. In some implementations, the angle of the content creation interface defines the angle at which the computer-generated graphical object is placed within the computer-generated graphical setting.

As represented by block 6-1, the method 600 includes obtaining an input directed to a content creation interface (e.g., a sketchpad), wherein the input corresponds to a sketch of a candidate object, and wherein the content creation interface facilitates creation of computer-generated graphical objects presentable using the device. In some implementations, the device or a component thereof (e.g., the input interpreter 252 in FIG. 2) obtains and interprets the input directed to the content creation interface.

According to some implementations, the content creation interface corresponds to a planar, two-dimensional (2D) content creation interface. According to some implementations, the input (e.g., a content creation input) corresponds to one or more stylus inputs, touch inputs, eye tracking inputs, finger/hand tracking inputs, etc. within the content creation interface. For example, the sequence shown in FIGS. 4A and 4B illustrates inputs detected by the electronic device 120 from a stylus 401. In some implementations, the content creation interface corresponds to a three-dimensional (3D) content creation interface.

In some implementations, the method 600 includes generating haptic feedback while obtaining the input corresponding to the sketch of the candidate object in accordance with a determination that the input is within a threshold distance to a boundary of the content creation interface. For example, with reference to FIG. 4A, the electronic device 120 generates haptic feedback when the input nears an edge of the content creation interface 410.

In some implementations, the method 600 includes causing display of the content creation interface in response to detecting an invocation command, wherein the input is directed to the content creation interface. For example, with reference to FIG. 4A, the electronic device 120 causes the content creation interface 410 to be displayed concurrently with the computer-generated graphical setting 425 in response to an invocation command such as a hand gesture, voice command, or the like.

In some implementations, as represented by block 6-1a, the method 600 includes displaying the content creation interface together with imagery obtained using the one or more cameras of the device. As such, the device composites the computer-generated graphical content (including the content creation interface and any computer-generated graphical objects) with the imagery obtained using the one or more cameras (e.g., exterior-facing cameras) of the device (e.g., video pass-through) to generate a computer-generated graphical setting for presentation by the device. For example, the content creation interface is overlaid on the imagery obtained using the one or more cameras of the device and/or on the computer-generated graphical setting.

In some implementations, as represented by block 6-1b, the method 600 includes causing display of the content creation interface on a second device. For example, the sequence shown in FIGS. 5A and 5B illustrates the content creation interface 410 displayed on the secondary electronic device 520 while the computer-generated graphical setting 425 is presented by the electronic device 120.

In some implementations, as represented by block 6-1c, the content creation interface is displayed adjacent to a computer-generated graphical setting. For example, the sequence shown in FIGS. 4A and 4B illustrates the content creation interface 410 concurrently displayed adjacent to the computer-generated graphical setting 425.

As represented by block 6-2, the method 600 includes obtaining a three-dimensional (3D) model using the input that corresponds to the sketch of the candidate object. In some implementations, the device or a component thereof (e.g., the model obtainer 256 in FIG. 2) obtains a 3D model based on the input that corresponds to the sketch of the candidate object.

In some implementations, as represented by block 6-2a, obtaining the 3D model includes matching the sketch of the candidate object to a pre-existing 3D model in a 3D model library. In some implementations, the device or a component thereof (e.g., the model obtainer 256 in FIG. 2) obtains the 3D model by matching the sketch of the candidate object to a pre-existing 3D model in the 3D model library 258. For example, the model obtainer 256 obtains a 3D model from the 3D model library 258 that matches the sketch of the candidate object within a predefined confidence threshold.

In some implementations, as represented by block 6-2*b*, obtaining the 3D model includes generating the 3D model based on the sketch of the candidate object. In some implementations, the device or a component thereof (e.g., the model obtainer 256 in FIG. 2) obtains the 3D model by generating the 3D model in real time based on the sketch of the candidate object and (optionally) depth information. According to some implementations, generating the 3D model includes inferring depth information associated with the sketch of the candidate object based on photogrammetry techniques and/or the like. In some implementations, the device or a component thereof (e.g., the depth inference engine 254 in FIG. 2) infers depth information (e.g., a depth map or mesh) for the candidate object corresponding to the sketch based on photogrammetry techniques or the like.

As represented by block 6-3, the method 600 includes generating a computer-generated graphical object using the obtained 3D model. In some implementations, the controller 110 or a component thereof (e.g., the model obtainer 256 in FIG. 2) generates the computer-generated graphical object using the obtained 3D model. In some implementations, the method 600 includes generating the computer-generated graphical object includes obtaining a mesh having a texture.

As represented by block 6-4, the method 600 includes causing presentation of the computer-generated graphical object together with imagery obtained using the one or more cameras of the device. For example, with reference to FIG. 4B, the electronic device 120 displays the computer-generated graphical object 475 (e.g., a 3D palm tree) within the computer-generated graphical setting 425 in response to detecting the user input 465 (e.g., a sketch of a palm tree) within the content creation interface 410.

As one example, assuming the functionalities of the controller 110 and the electronic device 120 are separate, the controller 110 or a component thereof (e.g., the content manager 246 in FIG. 2) renders an image frame associated with the computer-generated graphical setting that includes the computer-generated graphical object. Continuing with this example, the controller 110 or a component thereof (e.g., the data transmitter 262 in FIG. 2) transmits the rendered image frame to the electronic device 120. Finally, continuing with this example the electronic device 120 or a component thereof (e.g., the data obtainer 342 in FIG. 3) receives the rendered image frame, and the electronic device 120 or a component thereof (e.g., the presenter 344 in FIG. 3) displays the rendered image frame via the one or more displays 312.

As another example, assuming the functionalities of the controller 110 and the electronic device 120 are combined, the device or a component thereof (e.g., the content manager 246 in FIG. 2) renders an image frame associated with the computer-generated graphical setting that includes the computer-generated graphical object, and the device or a component thereof (e.g., the presenter 344 in FIG. 3) displays the rendered image frame via the one or more displays 312.

In some implementations, as represented by block 6-4*a*, the method 600 includes determining a display location for the computer-generated graphical object using a location of the obtained input corresponding to the sketch of the candidate object, and wherein causing presentation of the computer-generated graphical object comprises causing presentation of the computer-generated graphical object at the determined display location. In some implementations, the location of the input within the content creation interface determines the translational coordinates associated with the placement of the computer-generated graphical object into the computer-generated graphical setting. In other words, a transformation maps the location of the input within the content creation interface to the placement location within the computer-generated graphical setting. Thus, as one example with reference to FIG. 5A, if the input associated with the sketch of the candidate object is detected within the upper portion of the 3D content creation interface 410 relative to the y-axis, the device places the computer-generated graphical object into the computer-generated graphical setting based on the location of the inputs such that the computer-generated graphical object may be floating in the air when displayed within the computer-generated graphical setting.

In some implementations, as represented by block 6-4*b*, at least one rotational dimension of the computer-generated graphical object corresponds to an angle of the content creation interface. In some implementations, one or more rotational dimensions (e.g., pitch, roll, and/or yaw) of the placement of the computer-generated graphical object into the computer-generated graphical setting is based on the angle of the content creation interface. Thus, as one example, if the content creation interface is pitched at a 45° angle, the device places the computer-generated graphical object into the computer-generated graphical setting pitched at a 45° angle. For example, the user is able to rotate and/or translate the content creation interface. In some implementations, one or more rotational dimensions (e.g., pitch, roll, and/or yaw) of the placement of the computer-generated graphical object into the computer-generated graphical setting is based on the angle of the input relative to the content creation interface.

In some implementations, as represented by block 6-5, the method 600 includes: obtaining an additional input directed to the presented computer-generated graphical object; and modifying the presented computer-generated graphical object according to the additional input. In some implementations, as represented by block 6-5*a*, modifying the presented computer-generated graphical object includes scaling the computer-generated graphical object, rotating the computer-generated graphical object, translating the computer-generated graphical object, animating the computer-generated graphical object, and/or the like. In some implementations, as represented by block 6-5*b*, modifying the presented computer-generated graphical object includes modifying at least one of a color, texture, shading, shadow, shape, etc. of the computer-generated graphical object.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a device including one or more cameras and non-transitory memory coupled to one or more processors:
   obtaining an input directed to a content creation region within a user interface,
      wherein the input corresponds to a sketch of a candidate object,
      wherein the content creation region facilitates creation of a computer-generated graphical object presentable using the device; and
      wherein the user interface includes the content creation region and a presentation region for computer-generated content; and
   in response to obtaining the input directed to the content creation region:
      presenting the sketch within the content creation region;
      obtaining a three-dimensional (3D) model using the input that corresponds to the sketch of the candidate object;
      generating the computer-generated graphical object using the 3D model; and
      causing presentation of the computer-generated graphical object together with imagery obtained using the one or more cameras of the device within the presentation region while maintaining presentation of the sketch within the content creation region.

2. The method of claim 1, wherein the user interface further includes a tools region with a plurality of selectable tools configured to change one or more characteristics of the sketch, associated with the input, presented within the content creation region.

3. The method of claim 1, wherein the user interface further includes a tools region with a plurality of selectable tools configured to change one or more characteristics of subsequent sketches associated with subsequent user inputs.

4. The method of claim 1, wherein obtaining the 3D model includes matching the sketch of the candidate object to the 3D model that is pre-existing in a 3D model library.

5. The method of claim 1, wherein obtaining the 3D model includes generating the 3D model based on the sketch of the candidate object.

6. The method of claim 1, wherein the input corresponds to at least one of one or more stylus inputs, one or more touch inputs, one or more finger tracking inputs, one or more hand tracking inputs, or one or more eye tracking inputs directed to the content creation region.

7. The method of claim 1, wherein generating the computer-generated graphical object includes obtaining a mesh having a texture.

8. The method of claim 1, further comprising:
   determining a display location for the computer-generated graphical object within the presentation region using a location of the input corresponding to the sketch of the candidate object, and wherein causing the presentation of the computer-generated graphical object comprises causing the presentation of the computer-generated graphical object at the determined display location within the presentation region.

9. The method of claim 1, wherein at least one rotational dimension of the computer-generated graphical object corresponds to an angle of the content creation region.

10. The method of claim 1, further comprising:
    generating haptic feedback while obtaining the input corresponding to the sketch of the candidate object in accordance with a determination that the input is within a threshold distance to a boundary of the content creation region.

11. The method of claim 1, further comprising:
    obtaining an additional input directed to the computer-generated graphical object; and
    modifying the computer-generated graphical object according to the additional input.

12. The method of claim 11, wherein modifying the computer-generated graphical object includes at least one of scaling, rotating, translating, or animating the computer-generated graphical object.

13. The method of claim 11, wherein modifying the computer-generated graphical object includes modifying at least one of a color, texture, shading, shadow, or shape of the computer-generated graphical object.

14. A device comprising:
    one or more processors;
    a non-transitory memory;
    one or more cameras; and
    one or more programs stored in the non-transitory memory, which, when executed by the one or more processors, cause the device to:
       obtain an input directed to a content creation region within a user interface, wherein the input corresponds to a sketch of a candidate object, wherein the content creation region facilitates creation of a computer-generated graphical object presentable using the device; and wherein the user interface includes the content creation region and a presentation region for computer-generated content; and in response to obtaining the input directed to the content creation region:

present the sketch within the content creation region;

obtain a three-dimensional (3D) model using the input that corresponds to the sketch of the candidate object;

generate the computer-generated graphical object using the 3D model; and cause presentation of the computer-generated graphical object together with imagery obtained using the one or more cameras of the device within the presentation region while maintaining presentation of the sketch within the content creation region.

15. The device of claim 14, wherein the user interface further includes a tools region with a plurality of selectable tools configured to change one or more characteristics of the sketch, associated with the input, presented within the content creation region.

16. The device of claim 14, wherein the user interface further includes a tools region with a plurality of selectable tools configured to change one or more characteristics of subsequent sketches associated with subsequent user inputs.

17. The device of claim 14, wherein the input corresponds to at least one of one or more stylus inputs, one or more touch inputs, one or more finger tracking inputs, one or more hand tracking inputs, or one or more eye tracking inputs directed to the content creation region.

18. A non-transitory memory storing one or more programs, which, when executed by one or more processors of a device with one or more cameras, cause the device to:

obtain an input directed to a content creation region within a user interface, wherein the input corresponds to a sketch of a candidate object, wherein the content creation region facilitates creation of a computer-generated graphical object presentable using the device; and wherein the user interface includes the content creation region and a presentation region for computer-generated content; and in response to obtaining the input directed to the content creation region:

present the sketch within the content creation region;

obtain a three-dimensional (3D) model using the input that corresponds to the sketch of the candidate object;

generate the computer-generated graphical object using the 3D model; and cause presentation of the computer-generated graphical object together with imagery obtained using the one or more cameras of the device within the presentation region while maintaining presentation of the sketch within the content creation region.

19. The non-transitory memory of claim 18, wherein the user interface further includes a tools region with a plurality of selectable tools configured to change one or more characteristics of the sketch, associated with the input, presented within the content creation region.

20. The non-transitory memory of claim 18, wherein the user interface further includes a tools region with a plurality of selectable tools configured to change one or more characteristics of subsequent sketches associated with subsequent user inputs.

21. The non-transitory memory of claim 18, wherein the input corresponds to at least one of one or more stylus inputs, one or more touch inputs, one or more finger tracking inputs, one or more hand tracking inputs, or one or more eye tracking inputs directed to the content creation region.

* * * * *